United States Patent
Conner et al.

(10) Patent No.: US 8,676,234 B2
(45) Date of Patent: Mar. 18, 2014

(54) PERSONAL NETWORKING NODE FOR TACTICAL OPERATIONS AND COMMUNICATIONS

(75) Inventors: Keith F. Conner, Boonton, NJ (US); Christopher L. Weimer, West Milford, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 170 days.

(21) Appl. No.: 13/380,068

(22) PCT Filed: Apr. 21, 2011

(86) PCT No.: PCT/US2011/033402
§ 371 (c)(1),
(2), (4) Date: Dec. 22, 2011

(87) PCT Pub. No.: WO2011/133754
PCT Pub. Date: Oct. 27, 2011

(65) Prior Publication Data
US 2012/0094697 A1    Apr. 19, 2012

Related U.S. Application Data

(60) Provisional application No. 61/326,926, filed on Apr. 22, 2010, provisional application No. 61/326,941, filed on Apr. 22, 2010.

(51) Int. Cl.
*H04W 4/02* (2009.01)
(52) U.S. Cl.
USPC .................................... 455/456.3; 455/456.1
(58) Field of Classification Search
USPC ................ 455/456.1, 456.5, 456.6, 457, 403, 455/404.2, 456.3
See application file for complete search history.

(56) References Cited

U.S. PATENT DOCUMENTS

| | | | | |
|---|---|---|---|---|
| 6,804,523 | B2 * | 10/2004 | Shiraga | 455/450 |
| 7,672,681 | B1 * | 3/2010 | Beyer, Jr. | 455/457 |
| 2004/0203918 | A1 * | 10/2004 | Moriguchi et al. | 455/456.1 |
| 2007/0142091 | A1 | 6/2007 | Gasborro et al. | |
| 2008/0214210 | A1 * | 9/2008 | Rasanen et al. | 455/456.3 |
| 2009/0005061 | A1 * | 1/2009 | Ward et al. | 455/456.1 |
| 2009/0248398 | A1 | 10/2009 | Aviran et al. | |
| 2010/0130232 | A1 * | 5/2010 | Dingler et al. | 455/456.3 |
| 2011/0077028 | A1 * | 3/2011 | Wilkes et al. | 455/456.3 |
| 2013/0046505 | A1 * | 2/2013 | Brunner et al. | 702/141 |

FOREIGN PATENT DOCUMENTS

KR   10-2008-0095559   10/2008

* cited by examiner

*Primary Examiner* — Cong Tran
(74) *Attorney, Agent, or Firm* — Leo Zucker; Daniel J. Long

(57) ABSTRACT

A tactical network includes a radio that provides communications and situational awareness for a given user. The radio includes a screen, a communications module for linking the user with a network server, a knowledge management (KM) module for receiving alerts from the server and the communications module, and a map application that displays menu options for the user and receives the alerts from the server through the KM module. A communications interface initiates communications with the network server through the communications module, and sends information to the server from the map application. A user location module sends data corresponding to the user's location and targets identified by the user to the communications module for forwarding to the network server, and provides data originating from the server to the map application to show the locations of other radio users, their availability to exchange messages, and any targets they identify.

14 Claims, 8 Drawing Sheets

US 8,676,234 B2

PERSONAL NETWORKING NODE FOR TACTICAL OPERATIONS AND COMMUNICATIONS

CROSS REFERENCE TO RELATED APPLICATIONS

The present application claims priority under 35 U.S.C. Sec. 119(e) of U.S. Provisional Patent Application No. 61/326,926 filed Apr. 22, 2010, and titled Method and Apparatus to Provide a Situational Awareness Integrated Network Technologies (SAINT) System; and No. 61/326,941 also filed Apr. 22, 2010, and titled Method and Apparatus for Providing a Personal Networking Node (PNN). The two mentioned patent applications are incorporated herein by reference in their entireties.

BACKGROUND OF THE INVENTION

1. Field of the Invention

This invention relates to wireless information services, particularly location based services that provide maps and other information of interest with respect to a user's locale.

2. Discussion of the Known Art

Dismounted soldiers may be equipped with any one of a number of different military and commercial two-way radios during the course of a mission. Examples of commercial radios include Motorola Talkabout voice radios, Garmin Rino voice radios, and APCO Project 25 digital radios which provide voice communications and a user's GPS location but lack other location based services.

Examples of military radios include the AN/PRC-117G manpack radio, the tactical handheld AN/PRC-148 Multiband Inter/Intra Team Radio (MBITR), and radios configured according to the Single Channel Ground and Airborne Radio System (SINCGARS) and the Enhanced Position Location Reporting System (EPLRS).

Touch screen mobile devices (e.g., HTC Touch) are known to offer location based services of significant value to commercial users. Yet, no commercial or military radio is known that can supply a dismounted soldier with location based services, other than GPS, in a lightweight and affordable package. A need therefore exists for a low cost communication device that can provide accurate location based services to a warfighter including the locations of friendly and hostile forces and corresponding maps, as well as the ability to chat or text with his or her buddies during tactical operations.

SUMMARY OF THE INVENTION

According to the invention, a radio for providing a user with communications and situational awareness for tactical operations has a processor that is programmed and configured according to a mobile operating system and has GPS functionality, a viewing screen, a network interface, and a communications module configured to establish a communications link with an associated server through a network interface. A knowledge management (KM) module coupled to the network interface and the communications module is configured to receive alerts from the server and from the communications module. A map application coupled to the KM module and the viewing screen, is configured to display a number of menu options for selection by the user.

A communications interface is coupled between the communications module and the map application, and is operative to (i) initiate communications with the server through the communications module, (ii) handle a flow of information or data to be communicated to the server from the map application in response to a menu option selected by the user, and (iii) receive alerts sent to the radio from the server, through the KM module of the radio.

A presence and user location module is coupled between the communications module and the map application, and is operative to (i) send data corresponding to a location of the user and locations of targets identified by the user via the map application, to the communications module for forwarding to the server, and (ii) provide data originating from the server and corresponding to locations of other radio users, the presence or availability of the other users to exchange text or voice messages with the user, and targets identified by the other users, to the map application in the radio.

In a preferred embodiment, the inventive radio incorporates XMPP, SIP, and different media formats to provide situational awareness, voice, text, imagery, maps, information sharing, and event recording and playback for tactical and special operations dismount soldiers. The radio offers location based applications that enable the warfighter to gain knowledge of the locations of friendly and hostile forces, by the use of imagery on a secure tactical map.

For a better understanding of the invention, reference is made to the following description taken in conjunction with the accompanying drawing and the appended claims.

DETAILED DESCRIPTION OF THE INVENTION

A tactical gateway product suite developed by BAE Systems and called Situational Awareness Integrated Network Technologies or SAINT, extends the common operating picture (COP) to the tactical edge by distributing geospatially relevant information among various participants on a given mission. SAINT leverages commercial technology and networks to provide a warfighter with on-demand location based services. Its capabilities include wireless communications using commercial off the shelf (COTS) fixed/mobile base stations, IEEE 802.11 wireless access and GFE tactical radios; geo-referenced blue force tracking, targeting, and imaging (still and video); and gateway functionality among commercial networks including MOTOTRBO, Garmin radios, SOF, and Army networks such as Land Warrior, Raptor X (SOF GIS), PRC-117G, SINCGARS, and Force XXI Battle Command Brigade and Below (FBCB2). The geo-referenced information may be imported from outside sources such as Land Warrior, shared by a community of local users, and exported to outside consumers of interest such as FBCB2 or CPOF.

The SAINT suite includes an application package that operates on COTS handheld hardware including smart phones, cell phones, rugged PDAs, and UMPCs that can be easily carried by soldiers on the ground and use commercial cellular and/or IEEE 802.11 access protocols. SAINT also allows voice interoperability between mobile phones and tactical PTT radios (e.g., ATT Tilt to PRC-117G), as well as message or data interoperability across heterogeneous networks (e.g., JVMF to CoT).

Figure 1:
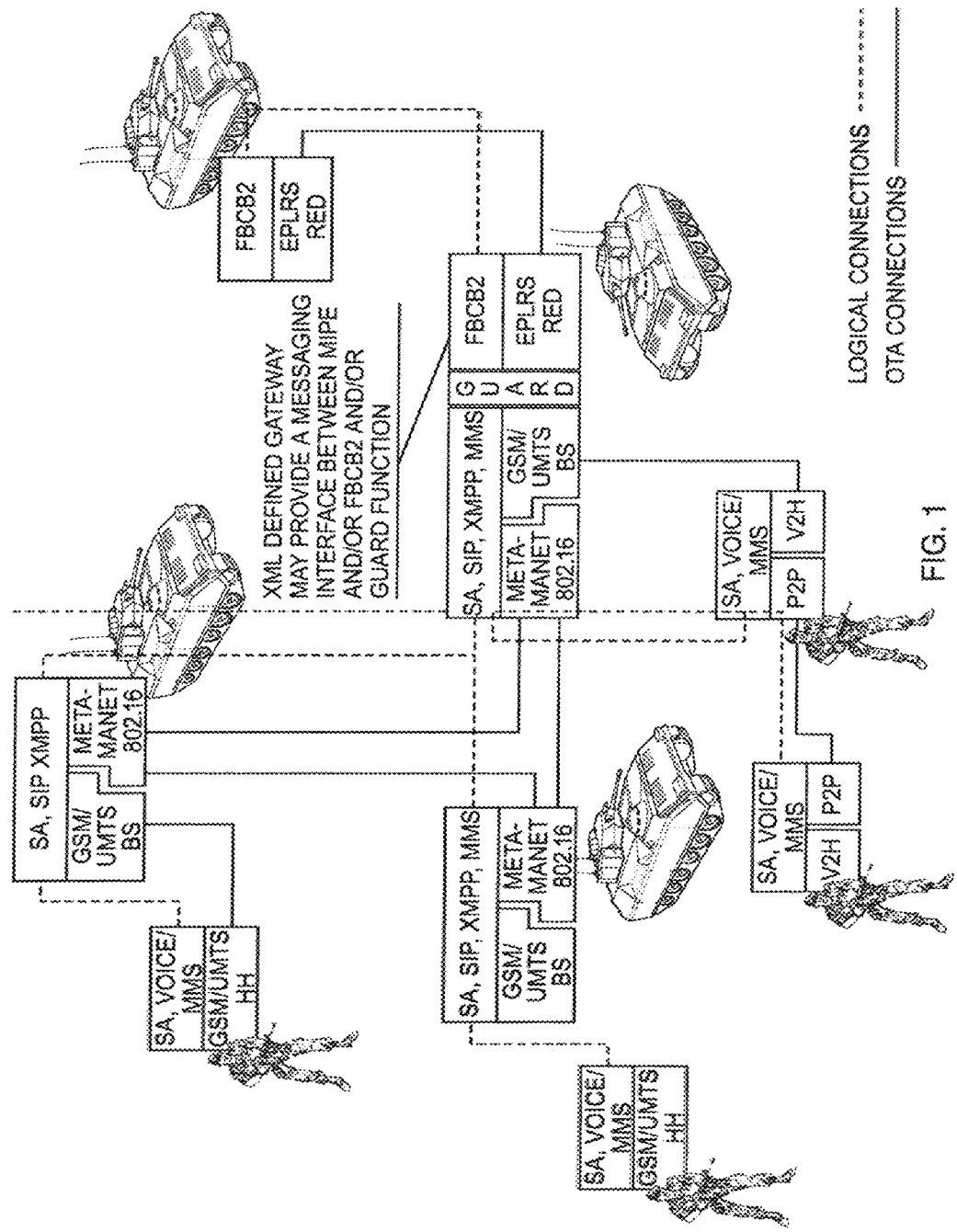
FIG. 1 is a graphic representation of a tactical communications system wherein situational awareness (SA) information from multiple sources is distributed to soldiers equipped with handheld wireless devices.

FIG. 1 illustrates the use of SAINT to provide secure location based services at low cost to tactical users, including individual dismounted soldiers carrying COTS cellular phone or other standard handheld wireless communication devices. SAINT offers self protection by informing each warfighter of where are my buddies and where are the hostiles, providing a secure geo-referenced tactical map with points of interest (POIs) and other imagery, enabling push-to-talk (PTT) operation of tactical radios such as SINCGARS through cellular networks, and providing interoperablity with various databases and Command and Control (C2) applications (e.g., Land Warrior and FBCB2).

The geo-referenced map features thumb friendly pop-up menus that allow the user to (a) add, modify, or attach comments or media files to POIs, (b) find, follow, and connect quickly to buddies, (c) access geo-referenced information such as pictures, and (d) obtain bearing and distance information to POIs. Buddy lists provide status information and a quick interface for finding and collaborating with other users. SAINT also allows group or individual text chat with visual indications to confirm delivery.

As mentioned, in addition to creating a tactical message gateway for interoperability with legacy situational awareness (SA) and command and control systems, the SAINT suite provides geo-referenced information including maps for display on a COTS cell phone or other lightweight hand held device easily carried by the warfighter. The latter application, referred to herein as a Personal Networking Node or PNN, is the subject of the present patent application and is described in further detail below.

A business person's lifeline in the commercial world comprises business calls and conferencing, pictures and product information, driving directions, instant messaging, streaming video, e-mail and data. By contrast, a warfighter's lifeline on the battlefield must handle voice communications and orders, human source intelligence (HUMINT) imagery and graphics, battlefield maps, situational awareness, text messaging, e-mail and data, and calls for fire or to adjust fire. The present invention can support the warfighter's needs through a COTS handheld wireless device that is programmed and configured to include:

1. Applications and features such as secure voice, text, and situational awareness with extended battery life;

2. Maximum connectivity when carried in a vehicular network, a stand alone vehicle, or in an isolated squad; and 3. Extended functionality including imagery, video and targeting, access to the Lower Tactical Internet (LTI) and Global Information Grid (GIG) services, and infrastructure roaming.

In a preferred embodiment, the inventive PNN incorporates the Extensible Messaging and Presence Protocol (XMPP), which is an open standard communications protocol based on Extensible Markup Language (XML). Previously called Jabber, XMPP was originally developed for near real time extensible instant messaging (IM), presence information, and contact list maintenance: Being extensible, XMPP is currently applied in Voice over Internet Protocol (VoIP) and file transfer communications. XMPP resides in the application layer of the Internet protocol suite. Detailed specifications for XMPP are set out in Internet Engineering Task Force (IETF) requests for comment (RFCs) 3920 to 3923 (October 2004) and are incorporated herein by reference.

PNN may also accommodate the Session Initiation Protocol (SIP), which is widely used for controlling multimedia communication sessions such as voice and video calls over Internet Protocol. SIP is a text based protocol commonly used for creating, modifying and terminating unicast or multicast sessions of one or more media streams. Other applications include video conferencing, streaming multimedia distribution, instant messaging, presence information, file transfer and on-line games. Like XMPP, SIP resides in the application layer of the Internet protocol suite. Since SIP is independent of the underlying transport layer, it can run using Transmission Control Protocol (TCP), User Datagram Protocol (UDP), or Stream Control Transmission Protocol (SCTP). Detailed specifications for SIP are set out in IETF RFC 3261 (June 2002) and are incorporated herein by reference.

According to the invention, PNN combines XMPP, SIP, GPS, and voice and imaging technologies in such a manner as to communicate situational awareness information to any warfighter equipped with a COTS handheld wireless device (e.g., cell phone, PDA or UMPC) having a display screen, and access to the Internet via a cellular base station or IEEE 802.11 (Wi-Fi), or through tactical or first responder radios, laptops or computers to which the device can be tethered. The device is operative to provide the warfighter with geo-registered blue force and red force tracking, targeting and imaging (still and video), voice, IM text, information sharing, event recording, and event playback to a community of users.

Figure 2:
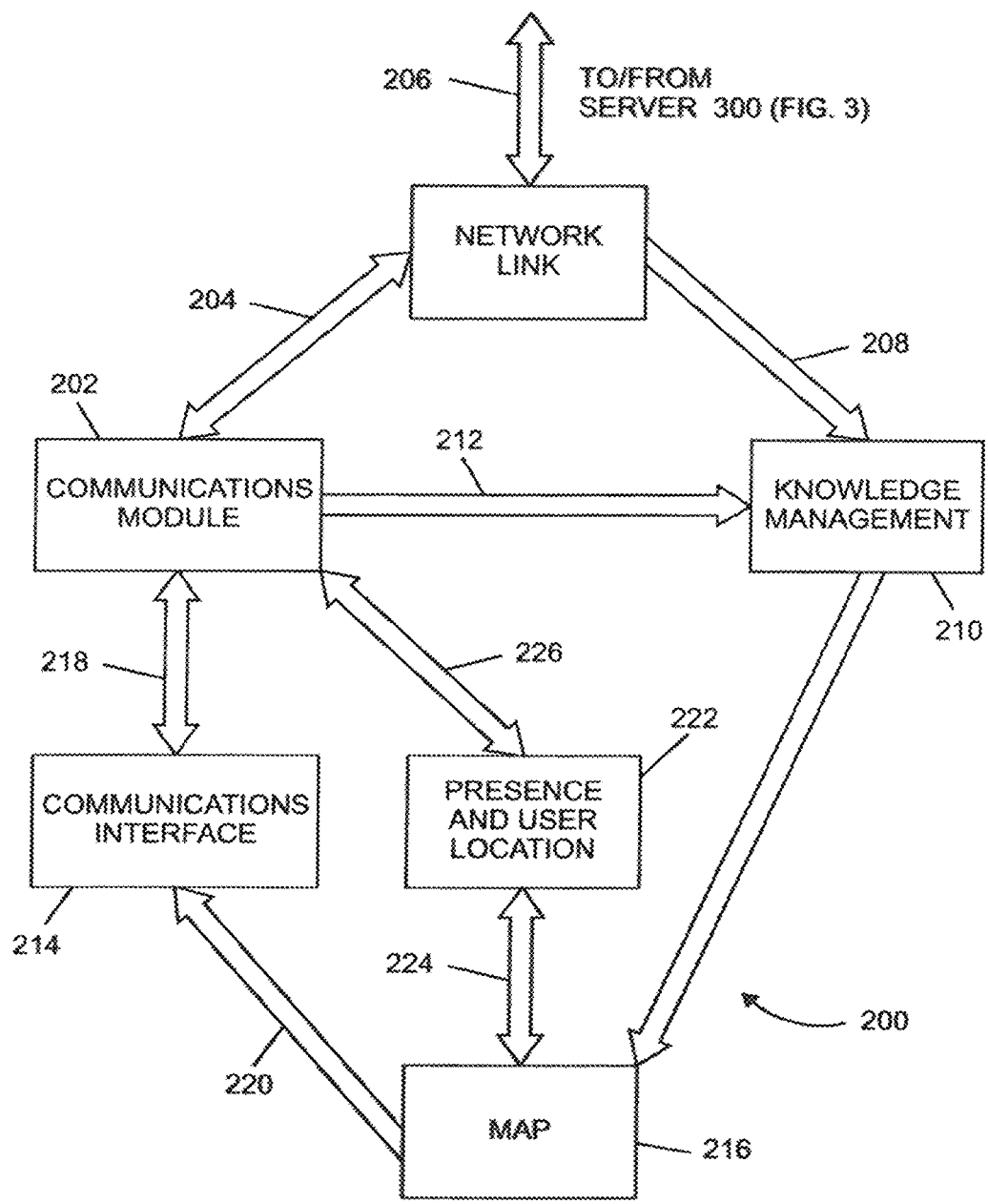
FIG. 2 is a schematic block diagram of a personal network node (PNN) radio according to the invention.
Figure 3:
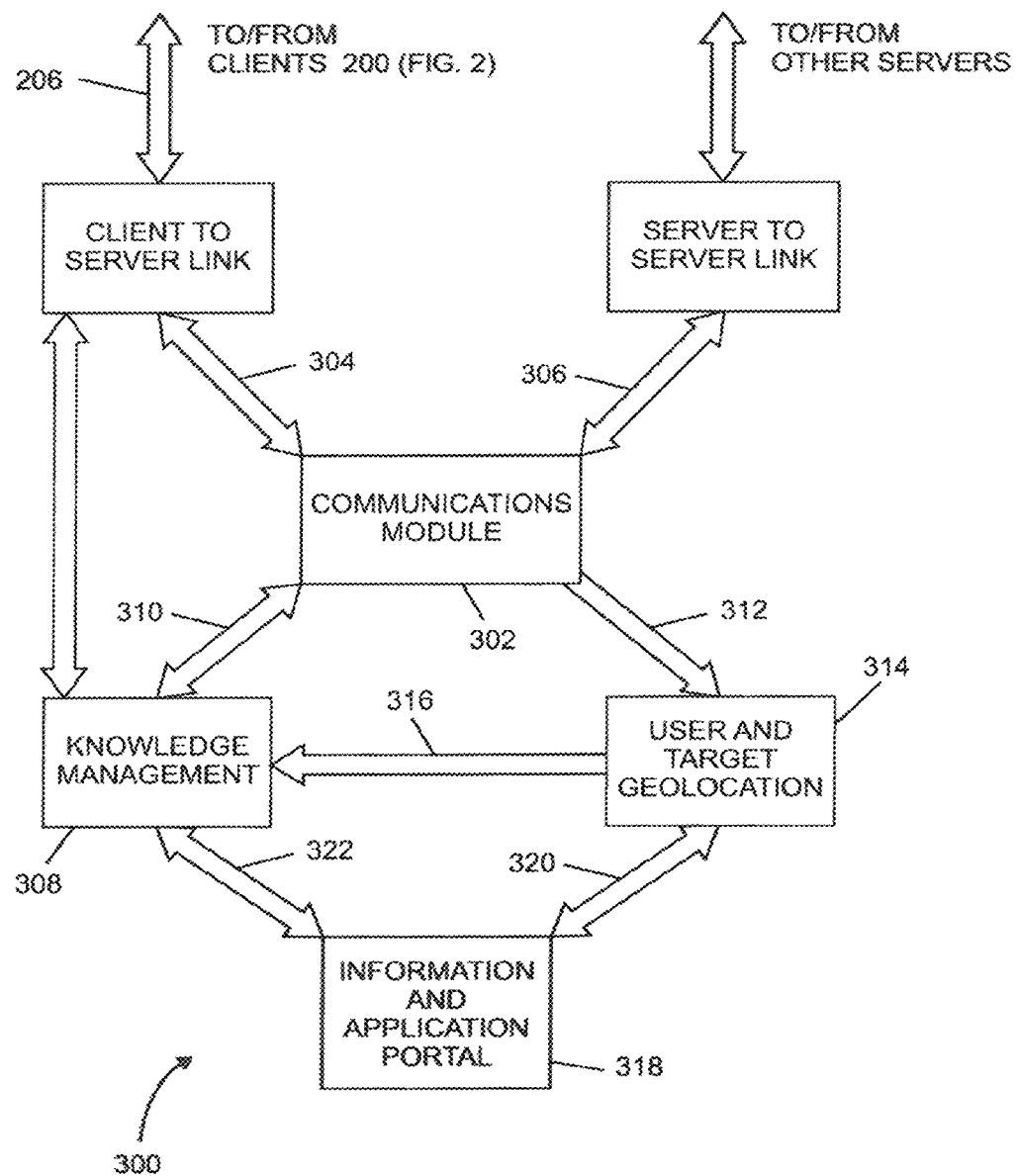
FIG. 3 is a schematic block diagram of a PNN server according to the invention.

FIG. 2 is a functional block diagram of a mobile handheld PNN radio 200 that is programmed and configured to provide a warfighter with the situational awareness information enumerated above in a convenient, light weight package, according to the invention. FIG. 3 is a functional block diagram of a PNN server 300 or equivalent data processing platform according to the invention, wherein the server 300 is programmed and configured to link with the radio 200 and to provide communications and situational awareness information for the radio user with updates at regular intervals.

The PNN radio 200 is preferably in the form of a COTS light weight, touch screen, programmable smart phone such as, without limitation, the earlier mentioned HTC Touch. The radio 200 has a communications module 202 that is configured to establish a secure XMPP and/or SIP communication link 204 via the Internet 206, to an XMPP or SIP communications module 302 in the PNN server 300 in FIG. 3. For security, it is preferred that the communication link 204 between each PNN radio 200 and the PNN server 300 be configured as part of a virtual private network (VPN) and/or incorporate other known encryption mechanisms. In one preferred embodiment, the PNN radio 200 is programmed and configured to store, among other applications, the known Android operating system (OS) including GPS functionality, and local map imagery preferably in the form of geo-referenced JPEG files. Other mobile operating systems may also be used, e.g., Windows Mobile.

In FIG. 2, certain knowledge management (KM) alerts 208 originating directly from the PNN server 300 are transmitted through the network 206 to a knowledge management module 210 in the PNN radio 200. Other KM alerts 212 are sent to the KM module 210 directly from the communications module 202 in the radio 200.

A communications interface 214 is configured in the PNN radio 200, between the communications module 202, and a map application 216 that is programmed to display a number of menu options for selection by a user of the radio as detailed below. The communications interface 214 is operative to initiate communications with the PNN server 300 through the communications module 202. The interface 214 handles a flow of information or data 218 to be communicated to the PNN server 300 from the map application 216 in response to selected menu options 220. The map application 216 also receives certain alerts addressed to the user of the radio 200 from the PNN server 300, through the knowledge management module 210.

The PNN radio 200 also has a presence and user location module 222 configured between the communications module 202 and the map application 216. The location module 222 is operative to send data 224 corresponding to the geographic location of a given user of the radio and the locations of targets identified by the given user via the map application 216, to the communications module 202 for forwarding to the PNN server 300. The location module 222 also serves to provide data 226 originating from the PNN server 300 and corresponding to the locations of other PNN radio users (i.e., buddies of the given user), their presence or availability for text chat or voice, and targets identified by the other users, to the map application 216 running in the given user's radio.

As seen in FIG. 3, the communications module 302 in the PNN server 300 is configured to send information to, and to receive information from, one or more PNN radios 200 (clients) that link at 304 with the module 302 via the Internet 206. As mentioned, the information is preferably exchanged using either XMPP or SIP. If desired, the communications module 302 of the PNN server 300 may also link at 306 with other servers that are programmed and configured to exchange messages, data and other tactical information including imagery to and from the PNN server 300. Such information is preferably exchanged through a multi-message translator (MMT) which is part of the mentioned SAINT tactical gateway suite, and is disclosed in International Application PCT/US2011/033204 filed Apr. 20, 2011, entitled Distributing Messages in Multiple Formats in Tactical Communications Networks, and assigned to the assignee of the present application and invention. All relevant portions of the foregoing application are incorporated herein by reference.

The PNN server 300 also has a knowledge management (KM) module 308 for receiving certain KM events that are sent from users of PNN radios 200 via SIP/XMPP. Such events include, without limitation, alerts, user locations, and targets. The KM module 308 also receives such events directly from the communications module 302 of the server at 310.

The communications module 302 forwards (at 312) messages containing geolocation information to a user and target geolocation module 314, which messages include the locations of users of the radios 200, targets, and images with GPS locations. The user and the target locations are forwarded (at 316) from the geolocation module 314 to the KM module 308.

An information and application portal 318 in the PNN server 300 is configured to share (at 320) geolocation data including GPS embedded images with the user and target geolocation module 314. The portal 318 signals the knowledge management module 308 (at 322) that information or applications are available through the portal, and allows a given user of the PNN radio 200 to access the information and applications based on the user's role and current situation.

EXAMPLE

Client Application for the PNN Radio 200

Figure 4:
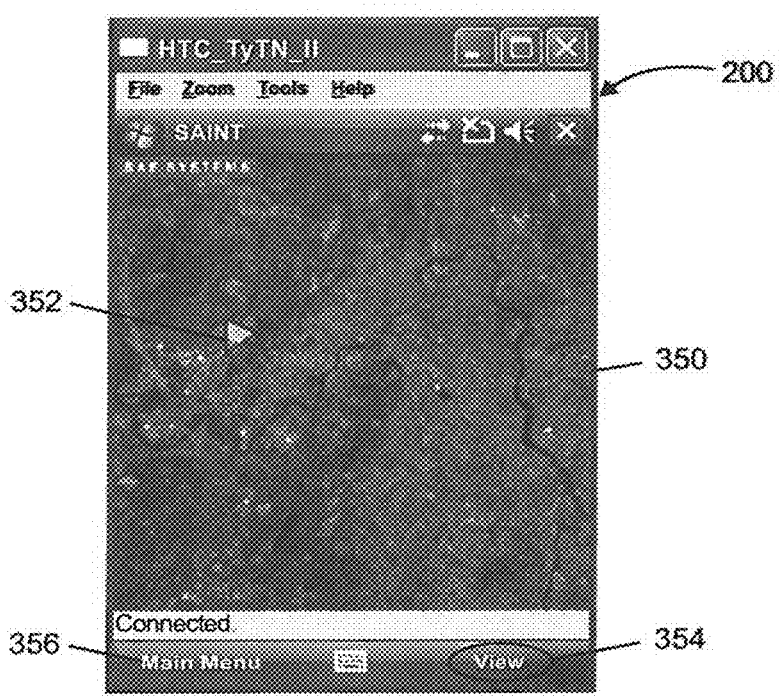
FIG. 4 is a map display on a screen of the inventive radio.

If the communication link 204 with the PNN server 300 is configured for a virtual private network (VPN), the client application in a given PNN radio 200 will initially prompt the user to enter a VPN username and a VPN password when the application is first run, followed by a second prompt for the user to log in by entering another username and password set. Once the radio links with the PNN server 300, a map 350 is displayed on the radio as in FIG. 4. The map 350 shows the user's locale, and an arrow 352 displayed on the map points to the location of the user. The user is given an option of choosing either a view menu 354 (FIG. 5) or a main menu 356 (FIG. 13) by selecting a corresponding button at the bottom of the screen in FIG. 4.

Figure 5:
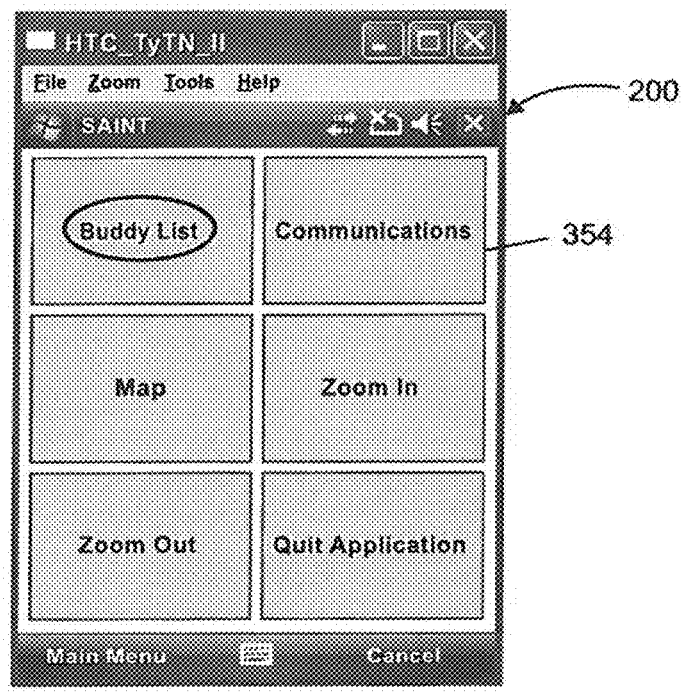
FIG. 5 is a view menu display on the radio screen.

When choosing the view menu 354 in FIG. 5, the user may select any of the following functions by name in the menu 354; (i) Buddy List, (ii) Communications, (iii) Map, (iv) Zoom In, and (v) Quit Application.

(i) Buddy List

Figure 6:
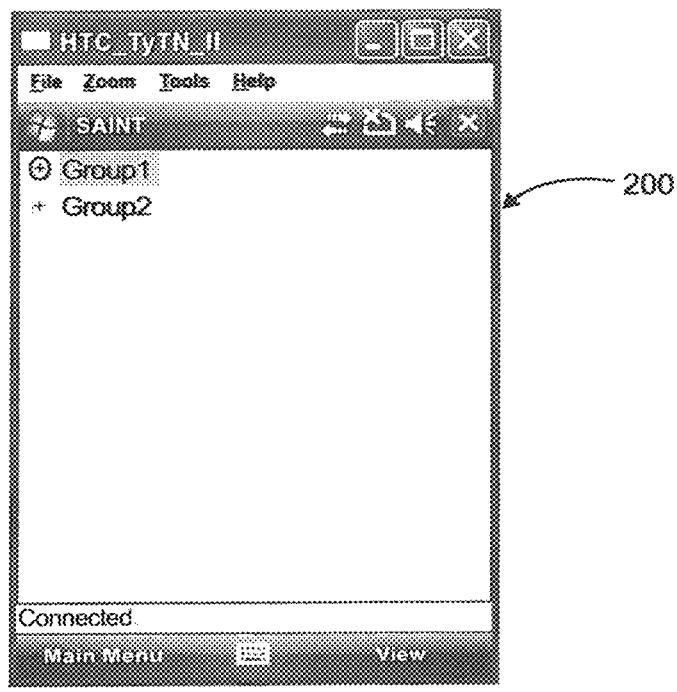
FIG. 6 is a screen display of numbered groups of buddies of the user.
Figure 7:
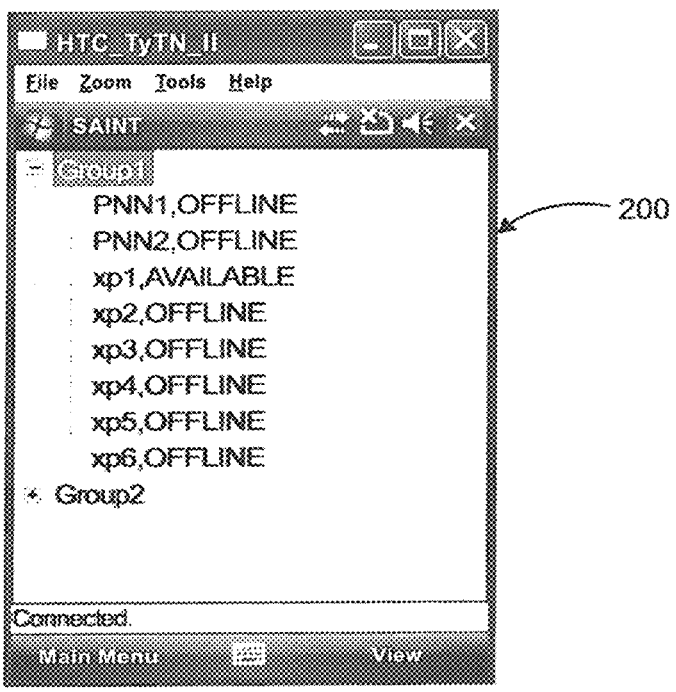
FIG. 7 is a screen display of the buddies of a selected group, and the current status of the buddies.

As seen in FIGS. 6 and 7, a given user's buddies may be divided into two or more numbered groups. The selection of a given group by the user, e.g., Group 1, causes a list of all buddies in Group 1 to be displayed with their present status (offline or available) as in FIG. 7. The background color of the display in FIG. 7 may signify whether or not the user's radio is linked to the PNN server 300. For example, a light green background may indicate an active server connection, while a light red background indicates no connection.

Figure 8:
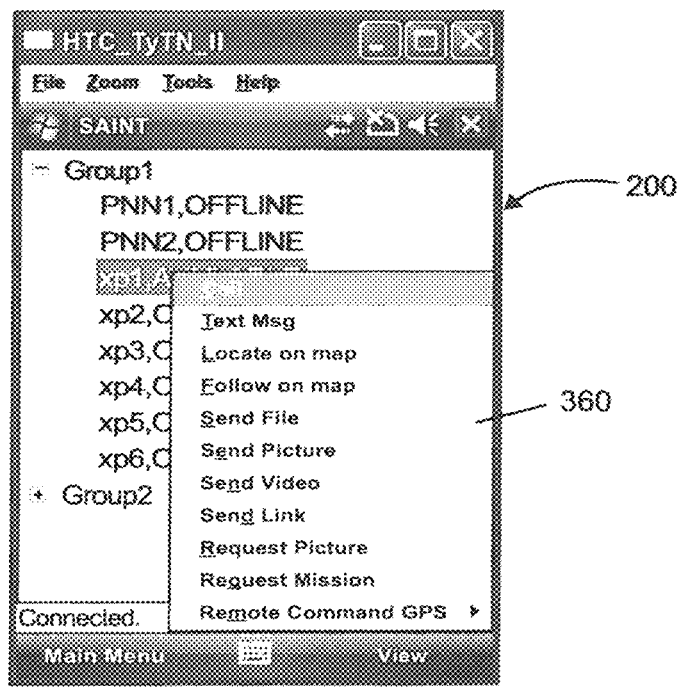
FIG. 8 is a screen display of communications actions that may be taken by a user of the inventive radio with respect to a selected buddy.

The user can select an available buddy with whom he or she wants to communicate by touching the buddy's ID on the display screen, or by highlighting the buddy and pressing enter. Upon doing so, a context menu 360 is displayed as in FIG. 8. The menu 360 affords the user a number of communications options, as follows:

Call—Places a voice call to the selected buddy.
 Text Msg—Brings up a text message window for the buddy.
 Locate on Map—Centers a map on the buddy's last location (if available).
 Follow on Map—Continually centers on the buddy's location on each update.
 Send File—Brings up a dialog to send a file to the buddy.
 Send Picture—Brings up a camera. After taking a picture, sends file.
 Send Video—Brings up the camera. After taking video, sends whole video file. May not be used to stream video.
 Send Link—Allows the user to send a link. This may display as a text message.
 Request Picture—Forces selected buddy to take a picture autonomously and to upload it. This option may be limited to buddies whose radios 200 use Windows Mobile for an OS, and is useful for placing a remote node and retrieving pictures.

Request Mission—Queries selected buddy for his or her current mission (waypoints and areas of interest), and downloads mission file.

Remote command GPS—Allows the user to turn a remote user's GPS function on or off.

(ii) Communications

Figure 9:
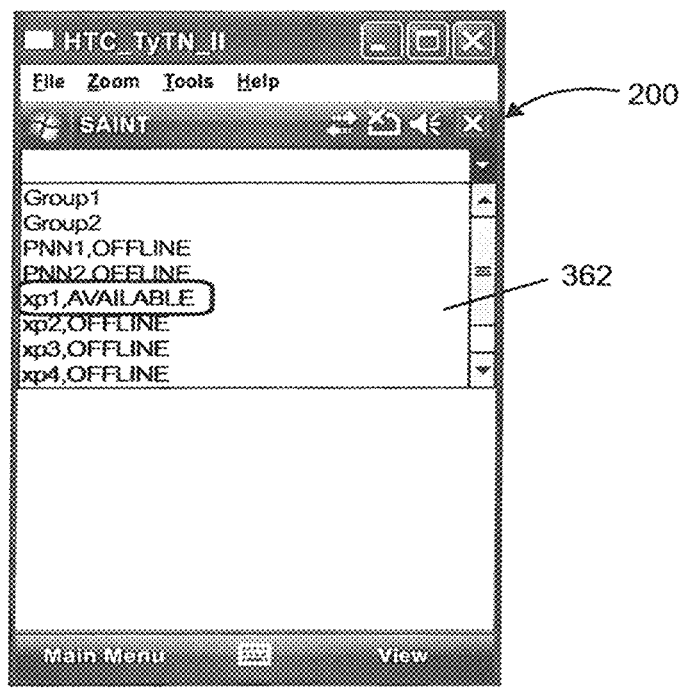
FIG. 9 is a screen display of buddies or groups to whom a user of the radio can send a text message or place a voice call according to the invention.

When selecting the communications function in the view menu 354 in FIG. 5, the user can pull a dropdown list 362 of buddies with their current status as shown in FIG. 9. Upon selecting a buddy, a screen as in FIG. 10 queries the user via buttons 364, 366 as to whether he/she wants to place a call or send a text message to the buddy. If the text button 366 is selected, a keyboard 368 is displayed at the bottom of the screen, and the user prepares a message that is displayed in a message input box 370 at the top of the screen as shown in FIG. 11. When done, the user presses an enter key 372 on the keyboard 368, and the prepared message is transmitted to the selected buddy through the PNN server 300 via the communications link 206 between the user's PNN radio 200 and the PNN server, and the communications link between the buddy's radio and the server.

Figure 12:
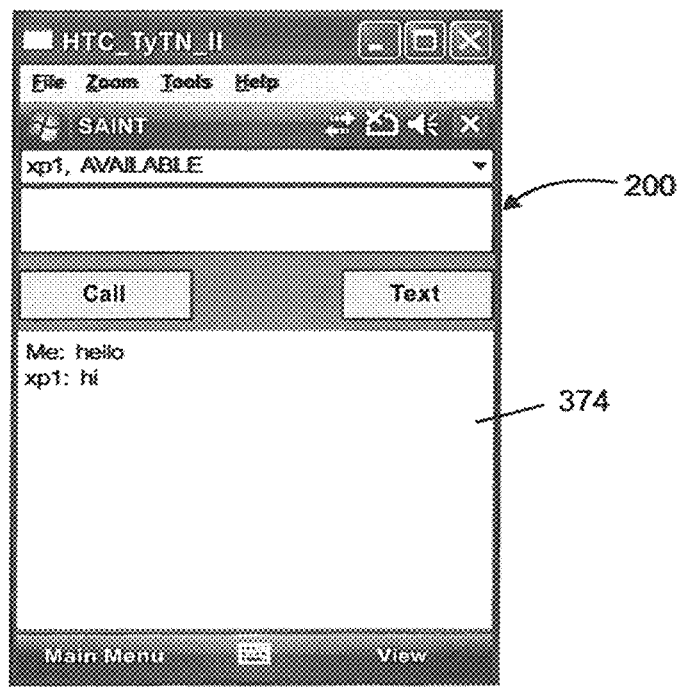
FIG. 12 is a screen display showing instant messaging (IM) text exchanged between a user of the inventive radio and a selected buddy.

Text is transmitted from the user's radio, and text is received from a buddy's radio, preferably in an instant messaging (IM) format and displayed within a messaging field 374 of the screen as shown in FIG. 12. Note that a text message is ordinarily sent to the buddy currently selected in the dropdown list 362 in FIG. 9. If a message is received from another buddy immediately before the user attempts to send a message to the selected buddy, the user's message may be sent to the wrong buddy (i.e., the buddy who sent the last IM) since the destination address for a user's outbound message normally changes each time the user receives an IM from a different buddy.

Figure 10:
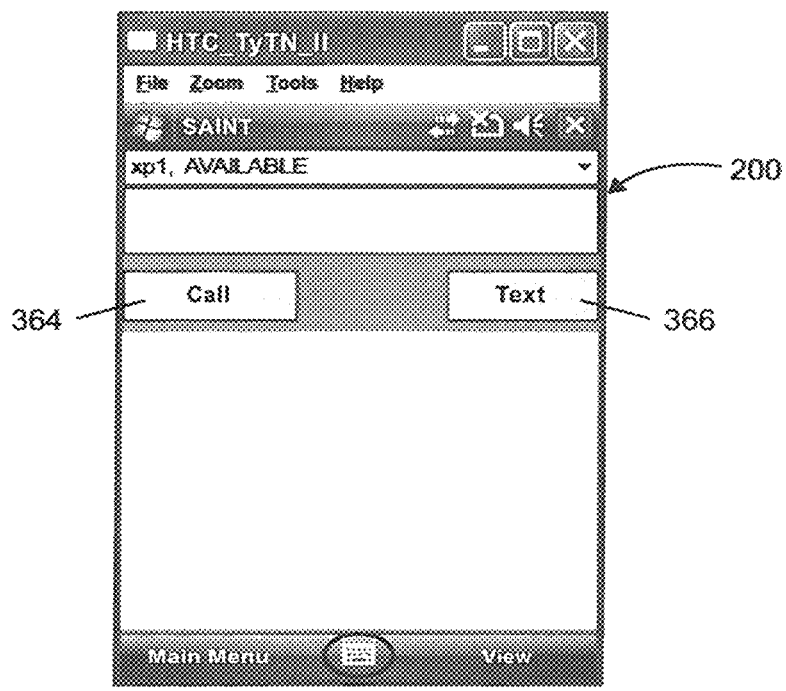
FIG. 10 is a screen display showing call and text option buttons for selection by a user of the radio.
Figure 11:
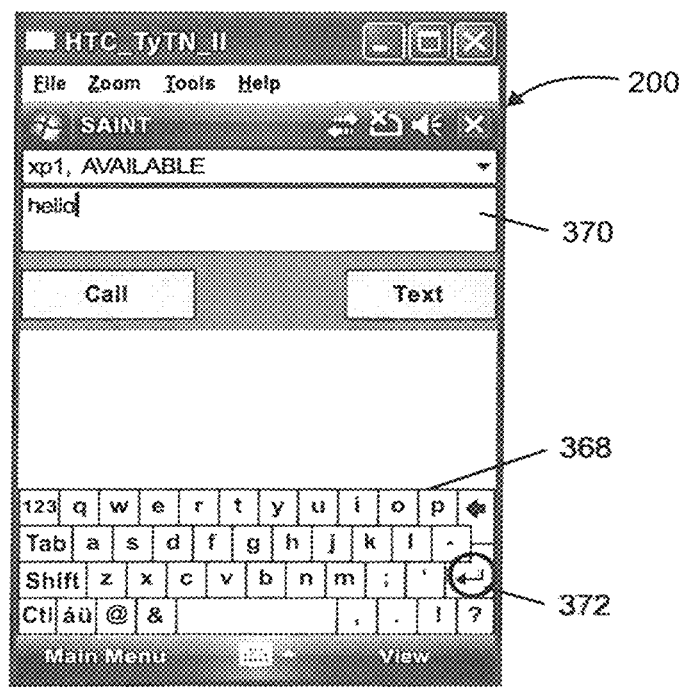
FIG. 11 is a screen display including a prepared message field.

If after selecting a buddy from the dropdown list 362 in FIG. 9 the user wants to place a voice call to the buddy, the user touches the call button 364 in FIG. 10. Voice data is then exchanged between the user and the selected buddy via XMPP or SIP through the PNN server 300, and the corresponding communications links 206 between the server and each of the user's and the buddy's radios.

Figure 13:
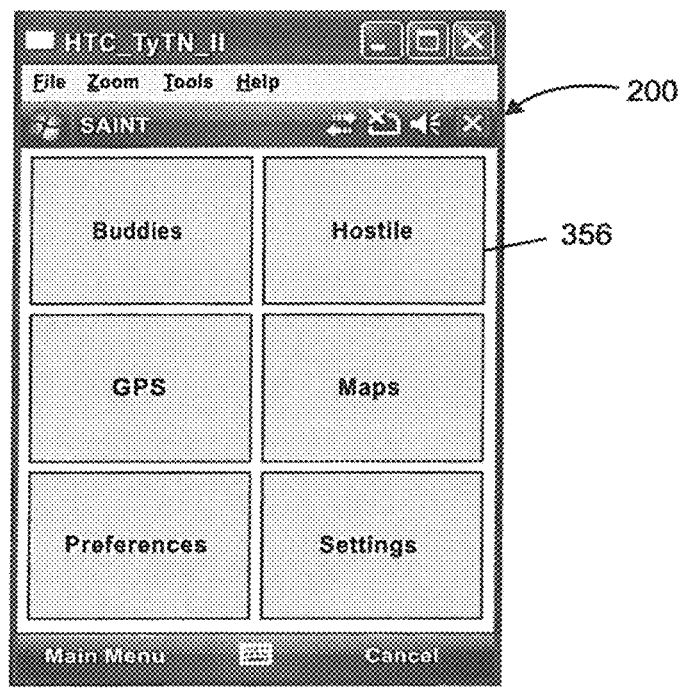
FIG. 13 is a main menu screen display.

When choosing the main menu 356 in FIG. 13, the user can select any of the following primary functions; (i) Buddies, (ii) Hostile, (iii) GPS, (iv) maps, (v) Preferences, and (vi) Settings. The main menu 356 is used basically for selecting actions and configuring settings.

(i) Buddies. Selecting Buddies allows the user to implement the following:

Call—Brings up dialog to select a buddy and place a call.

Text—Brings up dialog to select a buddy and send a text message.

Locate—Brings up dialog to select buddy and center on their last position.

Send File—Brings up dialog to select a buddy and send a file.

Send Picture—Brings up dialog to select a buddy and send a picture.

(ii) Hostile. Selecting Hostile allows the user to implement the following:

Add Target—Changes to Map menu. Adds a target at the next clicked location.

Move Target—Brings up a menu of targets to be moved. After selecting a target, the target is moved to the next clicked location.

Rmv Target—Brings up a menu of targets. Selected target will be deleted.

Target Info—Brings up a menu of targets, then displays dialog containing information on a selected target.

Remove All Local—Removes all targets on the local map (does not delete from PNN server).

(iii) GPS. Selecting GPS allows the user to implement the following:

Start GPS—Starts GPS device.

Stop GPS—Stops GPS device.

Com Port—Changes COM port used by the GPS device.

Baud—Changes the Baud rate of the COM port. Recommended not to be changed.

Where am I—Displays dialog with last reported latitude and longitude.

(iv) Maps. Selecting Maps allows the user to implement the following:

Center on GPS—Centers and locks map on local GPS position. To exit locked mode double click on map.

Draw>

Line—Click once for a start point of a line to be drawn, and the second click will place an end point of the line.

Rectangle—First click defines one corner, second click defines a second corner.

Circle—Placement of click defines the center of a drawn circle.

Delete Obj—Click on a drawn object to delete it.

Clear Drawings—Deletes all drawings.

Map Select—Brings up dialog to select a map for use.

Mission Planning—Brings up a context menu in a map.

GotoLocation—Allows the user to input latitude and longitude, respectively, in decimal degrees (−74.313 . . . 40.235)

(v) Preferences. Selecting Preferences allows the user to implement the following:

Login Information—Allows the user to change login information (username, password, server, voice server, and alias).

Alerts—Allows the user to select the type of alert given when a text message is received. For example, sound (on or off).

Cell/Sip Calls—Allows the user to use either cellular service or SIP (VoIP) service.

Colors—Allows the user to select colors for use on the map.

PTT Button—Allows the user to configure a hardware push to talk button (VoIP Only).

(vi) Settings. Selecting Settings allows the user to implement the following:

Declutter>

Friendlies—Toggles whether or not friendlies are displayed.

Hostiles—Toggles whether or not hostiles are displayed.

Neutrals—Toggles whether or not neutrals are displayed.

Sensors—Toggles whether or not sensors are displayed.

Unknown—Toggles whether or not unknowns are displayed.

Users—Toggles whether or not users are displayed.

Resize>

Icons>

Small—Configures map icons to be small.

Medium—Configures map icons to be default size.

Large—Configures map icons to be large.

Text>

Small—Configures buddylist text to be small.

Medium—Configures buddylist text to be default size.

Large—Configures buddylist text to be large.

System>

About—Shows information about the client.

Those skilled in the art will appreciate that the PNN radios 200 together with one or more PNN servers 300 provide a low cost, location based, tactical communications service for dismounted soldiers. XMPP, SIP, GPS, voice, and known imaging technologies are used in such a manner as to provide the warfighter with tactical situational awareness information and data on a COTS handheld device with cellular or IEEE 802.11 access, or by tethering the device to existing first-responder or tactical radios that have access to the Internet.

While the foregoing represents preferred embodiments of the invention, those skilled in the art will understand that various changes and modifications may be made without departing from the spirit and scope of the invention, and that the present invention includes all such changes and modifications as are within the scope of the following claims.

The invention claimed is:

1. A radio network for providing communications and situational awareness for personnel engaged in tactical operations, comprising:
    a network server including:
        a first communications module configured to send and receive tactical information to and from a number of associated network radios;
        a user and target geolocation module coupled to the first communications module for receiving messages originating from users of the network radios that contain geolocation information including locations of the users, and targets identified by the users including images and locations of the targets;
        a first knowledge management (KM) module coupled to the first communications module and to the user and target geolocation module, wherein the first KM module is configured to send a given network radio user certain KM events including locations of other radio users, and targets identified by the other radio users including images and locations of the targets; and
    one or more network radios, wherein each radio includes;
        a viewing screen;
        a network interface;
        a second communications module coupled to the network interface and configured to establish a communication link with the network server;
        a second knowledge management (KM) module coupled to the network interface and to the second communications module, wherein the second KM module is configured to receive the KM events originating from the network server and other alerts from the second communications module;
        a map application coupled to the second KM module and to the viewing screen, wherein the application is configured to display a number of menu options for selection by the user;
        a communications interface coupled between the second communications module and the map application, wherein the communications interface is operative to (i) initiate communications with the network server through the second communications module, and (ii) handle a flow of information or data from the map application to be communicated to the network server in response to a menu option selected by the user; and
        a presence and user location module coupled between the second communications module and the map application, wherein the presence and user location module is operative to (i) send data corresponding to a location of the user and locations of targets identified by the user via the map application, to the second communications module for forwarding to the network server, and (ii) provide data originating from the network server and corresponding to locations of other radio users, the presence or availability of the other users to exchange text or voice messages with the user, and targets identified by the other users, to the map application.

2. A radio network according to claim 1, wherein the viewing screen of the network radio is constructed and arranged for enabling the user to enter a command or a message in response to a touch of a command button or a keyboard image displayed on the screen.

3. A radio network according to claim 1, wherein the network interface of the network radio is configured to establish an Internet connection.

4. A radio network according to claim 3, wherein the network interface of the radio is constructed and arranged to establish the Internet connection through an IEEE 802.11 or a Wi-Fi access point.

5. A radio network according to claim 3, wherein the network interface of the radio is constructed and arranged to establish the Internet connection through a cellular wireless network.

6. A radio network according to claim 3, wherein the network interface of the radio is constructed and arranged to establish the Internet connection by tethering the radio from another radio or device that is connected to the Internet.

7. A radio network according to claim 1, wherein the first communications module of the server and the second communications module of the network radio are configured to operate according to the Extensible Messaging and Presence Protocol (XMPP).

8. A radio network according to claim 1, wherein the first communications module of the server and the second communications module of the network radio are configured to operate according to the Session Initiation Protocol (SIP).

9. A radio network according to claim 1, wherein the first communications module of the server and the second communications module of the network radio are configured to establish a secure communications link with one another.

10. A radio network according to claim 9, wherein the secure communications link is a virtual private network (VPN).

11. A radio network according to claim 1, wherein the map application in the network radio is configured to display a list of buddies of a user of the radio on the viewing screen in response to a buddy list command entered by the user.

12. A radio network according to claim 11, wherein the map application is operative to provide the user with a number of communications options on the viewing screen of the radio with respect to a buddy, a group of buddies, or other radios selected by the user.

13. A radio network according to claim 12, wherein the communications options include at least one of text messaging, voice calling, centering or following a selected buddy on a displayed map; sending text, image or video files; sending a link, requesting a picture, requesting a selected buddy's mission, and activating or deactivating a GPS function of a remote user.

14. A radio network according to claim 1, wherein the map application in the network radio is configured to enable the user to add, move, or remove a target at one or more locations on a map displayed on the viewing screen of the radio.

* * * * *